(12) United States Patent
Sharon et al.

(10) Patent No.: US 10,635,400 B2
(45) Date of Patent: Apr. 28, 2020

(54) SEED GENERATION

(71) Applicant: Western Digital Technologies, Inc., San Jose, CA (US)

(72) Inventors: Eran Sharon, Rishon Lezion (IL); Yoav Weinberg, Haifa (IL); Karin Inbar, Ramat Hasharon (IL); Omer Fainzilber, Even Yehuda (IL); Stella Achtenberg, Netanya (IL); Nika Yanuka, Hadera (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/839,668

(22) Filed: Dec. 12, 2017

(65) Prior Publication Data

US 2019/0179543 A1    Jun. 13, 2019

(51) Int. Cl.
*G06F 7/58* (2006.01)
*G06F 12/14* (2006.01)
*G11C 16/34* (2006.01)
*G06F 12/02* (2006.01)

(52) U.S. Cl.
CPC .......... *G06F 7/582* (2013.01); *G06F 12/0246* (2013.01); *G06F 12/14* (2013.01); *G11C 16/3427* (2013.01); *G06F 2212/402* (2013.01)

(58) Field of Classification Search
CPC .................. G11C 16/3418; G11C 16/3427
See application file for complete search history.

(56) References Cited

U.S. PATENT DOCUMENTS

| 8,700,974 B2* | 4/2014 | Chung ................. G11C 7/1006 |
| | | 714/763 |
| 9,672,105 B2* | 6/2017 | Chung ................. G06F 11/1072 |
| 2002/0037080 A1 | 3/2002 | Katayama et al. |
| 2003/0135798 A1 | 7/2003 | Katayama et al. |
| 2003/0223582 A1 | 12/2003 | Dagan |
| 2005/0226407 A1 | 10/2005 | Kasuya et al. |
| 2007/0140485 A1 | 6/2007 | Ghigo et al. |
| 2008/0151618 A1 | 6/2008 | Sharon et al. |

(Continued)

OTHER PUBLICATIONS

David Jones. "Good Practice in (Pseudo) Random Number Generation for Bioinformatics Applications." May 2010. http://www0.cs.ucl.ac.uk/staff/d.jones/GoodPracticeRNG.pdf. (Year: 2010).*

(Continued)

*Primary Examiner* — Nathan Sadler
(74) *Attorney, Agent, or Firm* — Kunzler Bean & Adamson, PC (57) ABSTRACT

Apparatuses, systems, methods, and computer program products are disclosed for seed generation. An apparatus includes a memory element. An apparatus includes a scrambler component. A scrambler component includes a random seed generation circuit that generates a random seed. A scrambler component includes a deterministic seed generation circuit that generates a deterministic seed based on a physical address of a memory element for storing data. A scrambler component includes a computation circuit that forms a computed seed based on a random seed and a deterministic seed. Data is scrambled using a computed seed before data is stored.

16 Claims, 5 Drawing Sheets

(56) References Cited

U.S. PATENT DOCUMENTS

| | | | |
|---|---|---|---|
| 2008/0215798 A1 | 9/2008 | Sharon et al. | |
| 2009/0204824 A1* | 8/2009 | Lin | G06F 12/0246 |
| | | | 713/193 |
| 2009/0282267 A1* | 11/2009 | Stern | G11C 11/5628 |
| | | | 713/193 |
| 2009/0323942 A1* | 12/2009 | Sharon | G11C 7/1006 |
| | | | 380/44 |
| 2011/0119432 A1* | 5/2011 | Yoon | G11C 7/1006 |
| | | | 711/103 |
| 2012/0144277 A1* | 6/2012 | Lee | G06F 11/1004 |
| | | | 714/807 |
| 2013/0083619 A1* | 4/2013 | Jeon | G11C 16/10 |
| | | | 365/230.08 |
| 2013/0101111 A1 | 4/2013 | Sharon et al. | |
| 2013/0315397 A1* | 11/2013 | Tuers | G06F 11/1012 |
| | | | 380/287 |
| 2014/0215126 A1 | 7/2014 | Avila et al. | |
| 2014/0310534 A1 | 10/2014 | Gurgi et al. | |
| 2014/0362990 A1 | 12/2014 | Kim et al. | |
| 2017/0115884 A1 | 4/2017 | Bhalerao et al. | |
| 2018/0074791 A1 | 3/2018 | Atsumi et al. | |
| 2019/0179772 A1 | 6/2019 | Ilani et al. | |

OTHER PUBLICATIONS

U.S. Appl. No. 15/962,766, Office Action, dated Aug. 5, 2019.
U.S. Appl. No. 15/962,766, Final Office Action, dated Jan. 6, 2020, pp. 1-19.

* cited by examiner

FIG. 4

SEED GENERATION

TECHNICAL FIELD

The present disclosure, in various embodiments, relates to memory die and more particularly relates to seed generation for scrambling data stored on memory die.

BACKGROUND

Many electrical circuits and devices, such as data storage devices or the like, include memory die. Memory die may be used to store data. Data may be scrambled before being stored to reduce wear to specific memory cells.

SUMMARY

Apparatuses are presented for seed generation. In one embodiment, an apparatus includes a memory element. An apparatus, in certain embodiments, includes a scrambler component. A scrambler component, in some embodiments, includes a random seed generation circuit that generates a random seed. In various embodiments, a scrambler component includes a deterministic seed generation circuit that generates a deterministic seed based on a physical address of a memory element for storing data. In one embodiment, a scrambler component includes a computation circuit that forms a computed seed based on a random seed and a deterministic seed. In some embodiments, data is scrambled using a computed seed before data is stored.

Methods are presented for seed generation. A method, in one embodiment, includes generating a seed based on a random seed and a physical address of a storage device for storing data. In various embodiments, a method includes storing a seed with data.

An apparatus for seed generation, in one embodiment, includes means for generating a random seed. In some embodiments, an apparatus includes means for generating a deterministic seed. In various embodiments, an apparatus includes means for generating a scrambling seed using a random seed and a deterministic seed. In certain embodiments, an apparatus includes means for scrambling data using a scrambling seed. In one embodiment, an apparatus includes means for storing scrambled data. In some embodiments, an apparatus includes means for extracting a scrambling seed from scrambled data. In various embodiments, an apparatus includes means for unscrambling scrambled data using a scrambling seed.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1A:
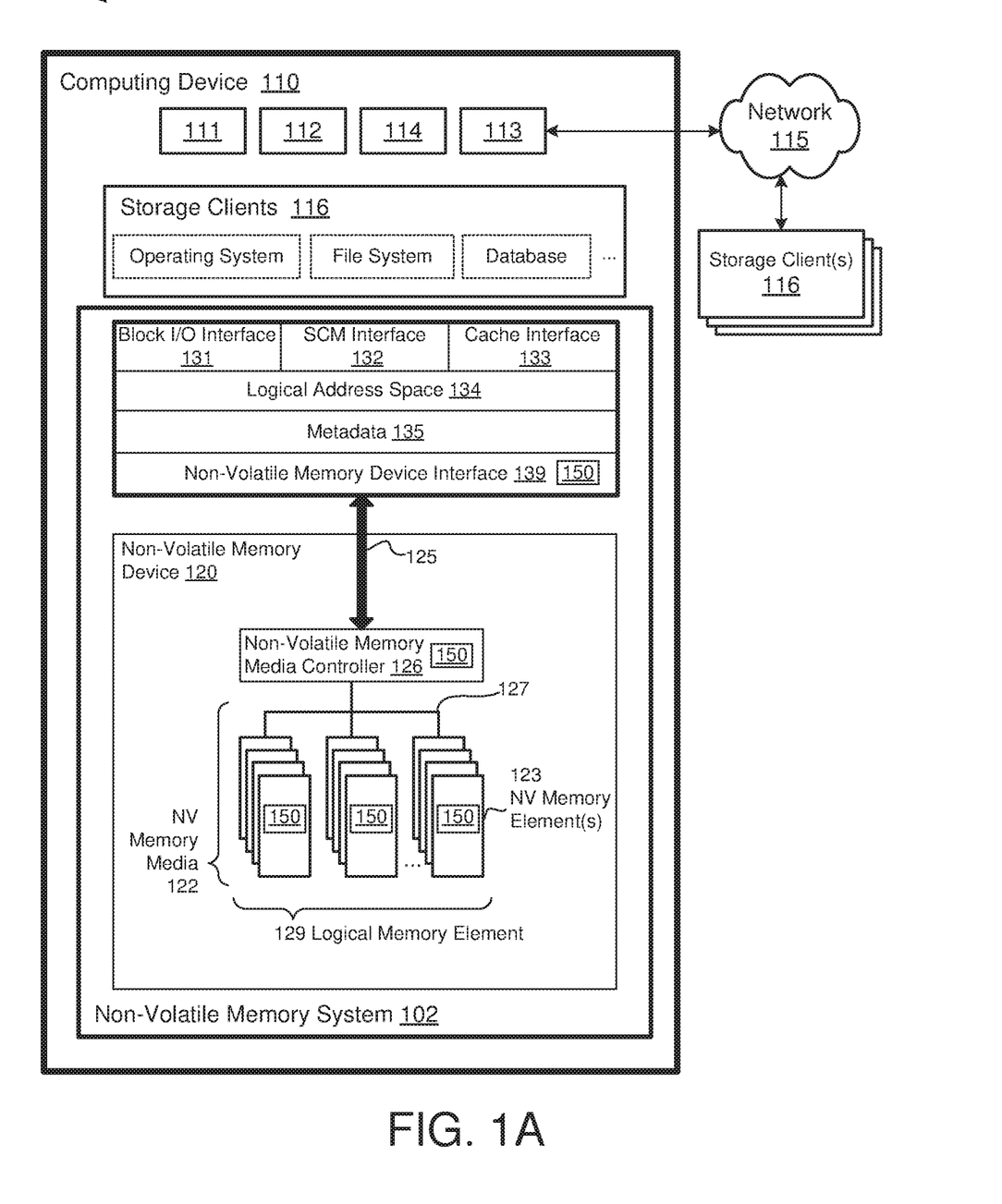
FIG. 1A is a schematic block diagram illustrating one embodiment of a system for seed generation.

FIG. 1A is a block diagram of one embodiment of a system 100 comprising a scrambler component 150 for a non-volatile memory device 120. The scrambler component 150 may be part of and/or in communication with a non-volatile memory media controller 126, a non-volatile memory element 123, a device driver, or the like. The scrambler component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more non-volatile DIMM (NVDIMM) cards, one or more persistent NVDIMM (NVDIMM-P) cards, one or more cache coherent interconnect for accelerators (CCIX) cards, one or more Gen-Z cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS)

bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the scrambler component 150 may be embodied as one or more computer readable instructions stored on the non-transitory storage medium 114.

The non-volatile memory system 102, in the depicted embodiment, includes a scrambler component 150. The scrambler component 150, in one embodiment, is configured to generate a random seed. The scrambler component 150, in certain embodiments, may generate a deterministic seed based on a physical address of a memory element (e.g., non-volatile memory device 120, non-volatile memory media 122, non-volatile memory element 123) for storing data. The scrambler component 150 may also form a computed seed based on the random seed and the deterministic seed. By using the scrambler component 150, data may be scrambled using the computed seed before the data is stored. By the computed seed being based on the random seed and the deterministic seed, the computed seed may be randomized and avoid correlations between data sequences programmed physically near one another.

In one embodiment, the scrambler component 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the scrambler component 150 may comprise executable software code, such as a device driver or the like, stored on the computer readable storage medium 114 for execution on the processor 111. In a further embodiment, the scrambler component 150 may include a combination of both executable software code and logic hardware.

In one embodiment, the scrambler component 150 is configured to receive storage requests from a device driver or other executable application via a bus 125 or the like. The scrambler component 150 may be further configured to transfer data to/from a device driver and/or storage clients 116 via the bus 125. Accordingly, the scrambler component 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the scrambler component 150 may receive storage requests as an API call from a storage client 116, as an IO-CTL command, or the like.

According to various embodiments, a non-volatile memory controller 126 in communication with one or more stripe placement components 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM) and/or persistent memory.

While legacy technologies such as NAND flash may be block and/or page addressable, storage class memory, in one embodiment, is byte addressable. In further embodiments, storage class memory may be faster and/or have a longer life (e.g., endurance) than NAND flash; may have random write access instead of or in addition to the sequential programming of NAND flash (e.g., allowing write-in-place programming of data); may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the non-volatile memory media controller 126 over a bus 125, as described above.

Figure 1B:
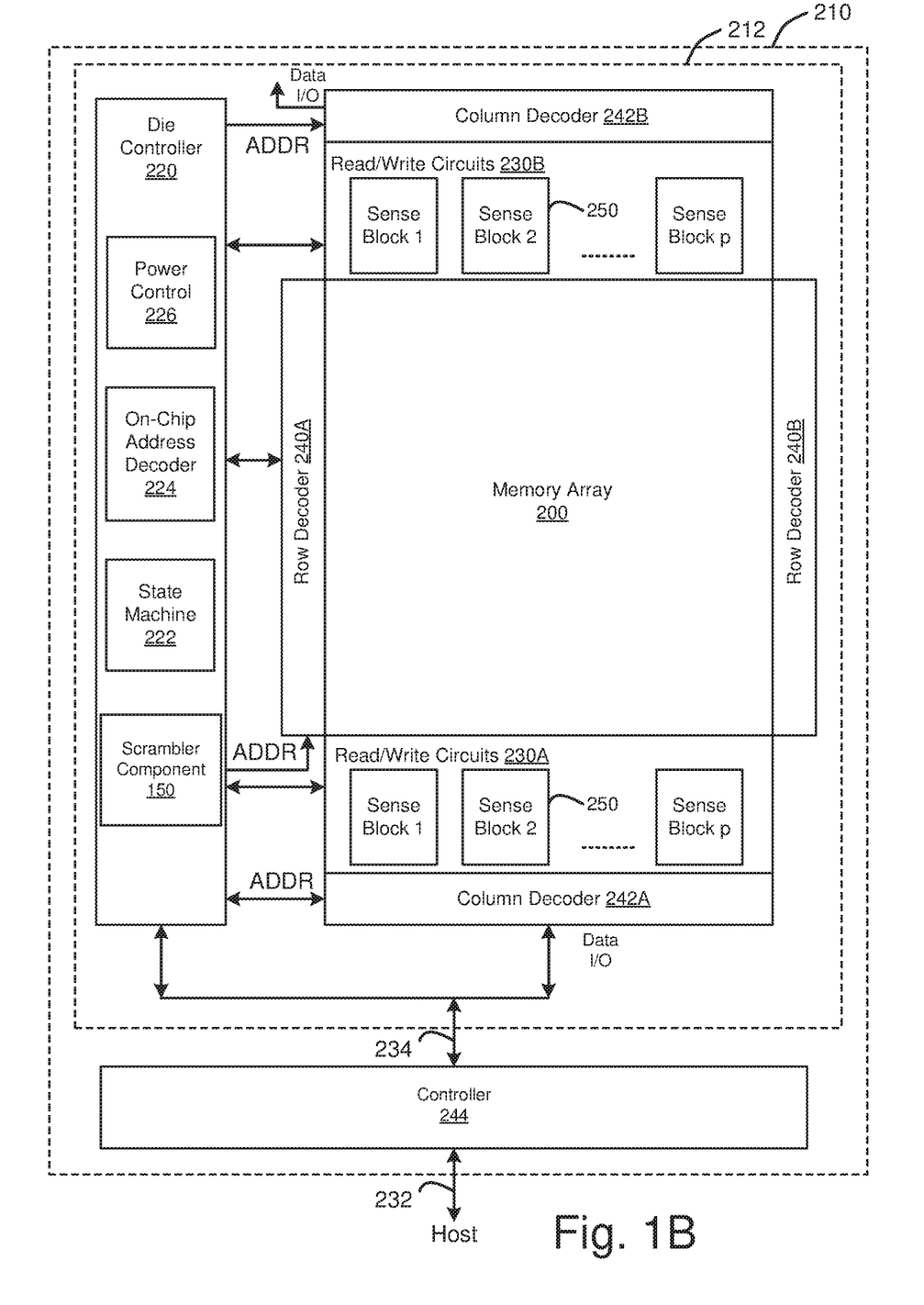
FIG. 1B is a schematic block diagram illustrating another embodiment of a system for seed generation.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory operations on the memory array 200. The die controller 220, in certain embodiments, includes a scrambler component 150, a state machine 222, an on-chip address decoder 224, and a power control 226. In one embodiment, the state machine 222 comprises at least a portion of the scrambler component 150. In a further embodiment, the controller 244 comprises at least a portion of the scrambler component 150. In various embodiments, one or more of the sense blocks 250 comprises at least a portion of the scrambler component 150.

The scrambler component 150, in one embodiment, is configured to generate a seed based on a random seed and a physical address of a storage device (e.g., non-volatile memory device 120, non-volatile memory media 122, non-volatile memory element 123) for storing data, and store the seed with the data.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. In certain embodiments, the state machine 222 includes an embodiment of the scrambler component 150. The scrambler component 150, in certain embodiments, is embodied as software in a device driver, hardware in a device controller 244, and/or hardware in a die controller 220 and/or state machine 222.

In one embodiment, one or any combination of die controller 220, scrambler component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

Figure 2:
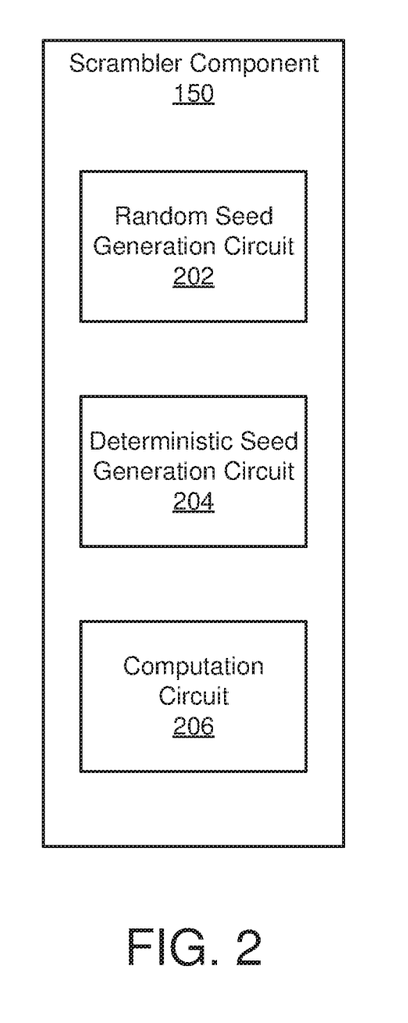
FIG. 2 is a schematic block diagram illustrating one embodiment of a scrambler component.

FIG. 2 depicts one embodiment of a scrambler component 150 (e.g., randomizer). The scrambler component 150 may be substantially similar to the scrambler component 150 described above with regard to FIGS. 1A and/or 1B. In general, as described above, the scrambler component 150 generates a random seed, generates a deterministic seed based on a physical address of the memory element for storing data, and forms a computed seed based on the random seed and the deterministic seed. Accordingly, the scrambler component 150 may facilitate generating a computed seed that is random and different from a seed used for scrambling data for a memory location adjacent to a memory location used for storing data scrambled using the computed seed. In the depicted embodiment, the scrambler component 150 includes a random seed generation circuit 202, a deterministic seed generation circuit 204, and a computation circuit 206.

In one embodiment, the random seed generation circuit 202 generates a random seed (Sr). In certain embodiments, the random seed may be generated by any suitable random source. In various embodiments, the random seed may include any suitable number of bits, such as 4 bits, 8 bits, 16 bits, 32 bits, 64 bits, 128 bits, and so forth. Moreover, in one embodiment, the random seed generation circuit 202 may facilitate the random seed being any suitable seed except all zeros. The random seed may be generated using a dedicated circuit or an existing circuit having random properties. In some embodiments, the random seed generation circuit 202 includes a random number generator (e.g., dedicated circuit) used to generate the random seed. In various embodiments, the random seed is generated based on an existing circuit having random properties (e.g., a system clock). For example, in one embodiment, the random seed is generated by sampling a system clock. In some embodiments, the random seed may be generated by sampling certain bits of a system clock (e.g., 4 least significant bits "LSBs", 3 LSBs, 2 LSBs, etc.). In certain embodiments, using a random seed may facilitate uniform wearing of a memory element used for storing data scrambled based on the random seed. Furthermore, using a random seed may facilitate inhibiting deep erase of memory elements. Moreover, the random seed may be generated so that the random seed changes randomly from one programming cycle to another.

In certain embodiments, the deterministic seed generation circuit 204 generates a deterministic seed (Sd). In some embodiments, the deterministic seed may be based on a physical address of a memory element for storing data. For example, the physical address of the memory element for storing the data may be encoded to generate the deterministic seed. In various embodiments, the deterministic seed generation circuit 204 generates the deterministic seed such that the deterministic seed satisfies a minimum distance threshold from another seed for an adjacent physical address (or physically near pages, physically near error-correcting code "ECC" blocks, physically near memory elements, physically near memory units, etc.). In one embodiment, the minimum distance threshold includes the deterministic seed being different from another seed for an adjacent physical address by at least four bits.

In certain embodiments, the deterministic seed is determined based on a hamming code (e.g., extended hamming code) determined using a physical address for storing data. In various embodiments, the hamming code transforms the physical address so that seeds for physically adjacent addresses have a number of bit differences satisfying a threshold. In some embodiments, the hamming code may facilitate for any two flash management units (FMUs) which are physically adjacent (e.g., having physical addresses P1 and P2) (or physically adjacent addresses, physically near pages, physically near error-correcting code "ECC" blocks, physically near memory elements, physically near memory units, etc.), the transformed physical addresses Sd1 and Sd2 having a large number of bit differences. More specifically, the hamming code may facilitate, if P1 and P2 are different solely in the 11 LSBs of P1 and P2, then Sd1 and Sd2 will be different by at least 4 bits.

In one example of generating the deterministic seed, the physical address (P) may include 16 bits (e.g., P=[p15 p14 p13 p12 p11 p12 p10 p9 p8 p7 p6 p5 p4 p3 p2 p1 p0]) having the following configuration: FMU number=[p1 p0]; plane number=[p2]; page number=[p13 p12 p11 p10 p9 p8 p7 p6 p5 p4 p3]; and die number=[p15 p14]. Moreover, the deterministic seed may be generated by performing the following transform on P: Sd=[t15 t14 t13 t12 t11 p10 p9 p8 p7 p6 p5 p4 p3 p2 p1 p0]; where t15=p15+p0+p5+p6+p7+p8+p9+p10; t14=p14+p0+p2+p3+p4+p5+p6+p8; t13=p13+p0+p1+p2+p4+p5+p7+p9; t12=p12+p0+p1+p3+p4+p6+p7+p10; and t11=p11+p0+p1+p2+p3+p8+p9+p10.

In another example of generating the deterministic seed, an index ($P_i$)=[p3 p2 p1 p0] represents the 4 LSBs of a page index, F=[f2 f1 f0] represents the FMU index within a 32 KB page in which f2 denotes a plane index. Moreover, in this example, the deterministic seed may be generated by performing the following transform on $P_i$ and F: Sd=[1+p0+p2+p3+f0+f1+f2, 1+p0+p1+p3+f1+f2, p0+p1+p2+f0+f2, p1+p2+p3+f0+f1+f2, p3+f1, p2+f0, p1, p0]. Furthermore, in another example, the deterministic seed may be generated using a 128 byte look up table (LUT) indexed by [f2 f1 f0 p3 p2 p1 p0].

In various embodiments, the deterministic seed generation circuit 204 generates the deterministic seed such that the deterministic seed is not a linear combination of a set of deterministic seeds associated with adjacent physical addresses. Such an embodiment may be used in embodiments in which scrambling is based on a linear function of the seed, such as using a linear feedback shift register (LFSR). For example, if the deterministic seeds of 3 FMUs satisfy Sd3=Sd1+Sd2 (Sd3 is a linear combination of a set of deterministic seeds), then the pseudo random scrambling sequences may satisfy PR3=PR1+PR2, and if the data is fixed, there may be correlations between programmed data sequences which may lead to disturb effects. By generating the deterministic seed so that the deterministic seed is not a linear combination of a set of deterministic seeds, correlations between programmed data sequences may be reduced, thereby reducing disturb effects.

In one embodiment, the deterministic seed generation circuit 204 generates a deterministic seed by encoding a physical address using a non-linear code. For example, the non-linear code may be implemented as a LUT that translates a physical address into a deterministic seed. By using the LUT based on a physical address, the deterministic seeds for physically near pages (or physically near ECC blocks) may be linearly independent. Specifically, using the LUT based on the physical address may facilitate any set of up to W physically near pages (or FMUs) have linear independence between their corresponding deterministic seed strings. As used herein, W may be a design parameter that determines a maximum number of linearly independent strings such that these strings correspond to W physical near pages (or FMUs). Moreover, when constructing the non-linear code used in the LUT with parameter W, each string in a set of W strings may have at least a distance d between each one of all other strings in the set. Accordingly, seeds of W physically near pages (or FMUs) may be linearly independent facilitating uniform distribution being applied for each wordline and neighboring cells. As such, a minimum distance dictated by the deterministic seed is ensured thereby facilitating scrambler correlations and data dependent disturb issues.

In a further example of generating the deterministic seed, an index (P)=[p3 p2 p1 p0] represents the 4 LSBs of a page index, F=[f2 f1 f0] represents the FMU index within a 32 KB page in which f2 denotes a plane index. Moreover, in this example, 8 non-linear codes (e.g., for each combination of F) may be constructed where there are 4 input bits (P) and 8 output bits (Sd). The construction of each non-linear code may be done in a manner in which 16 codewords of length 8 are determined such that each set of consecutive W codewords (e.g., that correspond to W physically near FMUs) are linearly independent and have minimum distance of d. Furthermore, the deterministic seed may be generated using a 128 byte LUT indexed by [f2 f1 f0 p3 p2 p1 p0].

In some embodiments, the computation circuit 206 forms (e.g., generates) a computed seed (e.g., scrambling seed) based on the random seed and the deterministic seed. The computed seed may include any suitable number of bits, such as 4 bits, 8 bits, 16 bits, 32 bits, 64 bits, 128 bits, and so forth. In various embodiments, the computed seed may include a result of a logic operation performed on the random seed and the deterministic seed. In such embodiments, the logic operation may include an AND operation, an OR operation, an exclusive OR (XOR) operation, or another operation. In certain embodiments, the computed seed includes a concatenation of the result of a logic operation and a random seed. In certain embodiments, the computed seed includes the random seed. For example, the computed seed may be computed by the following: computed seed=[XOR(Sd, Sr) Sr]. As another example, the computed seed may be computed by the following: computed seed=[Sd+Sr, Sr]. In various embodiments, the computed seed may be appended to a data header prior to encoding (e.g., scrambling) the data (with the data including the data header). Accordingly, the computed seed may be extracted from the data header after decoding the data in order to decode (e.g., descramble) the data.

The minimum distance threshold may be based on certain minimum distance properties that the deterministic seed is configured to satisfy. The minimum distance properties may be facilitated by construction of the deterministic seed. In one example, two physically near FMUs (e.g., a first FMU and a second FMU) may be considered. The first FMU may have a Seed1=[XOR(Sd1, Sr1) Sr1] and the second FMU may have a Seed2=[XOR(Sd2, Sr2) Sr2]. If Sr1=Sr2, then the difference between XOR(Sd1, Sr1) and XOR(Sd2, Sr2) will equal the difference between Sd1 and Sd2, which is at least the minimal distance of the algorithm used for constructing Sd (e.g., minimum distance d). Moreover, if XOR (Sd1, Sr1)=XOR(Sd2, Sr2), then because Sd1 and Sd2 have at least a minimum distance, then Sr1 and Sr2 may have the same minimum distance. Thus, overall Seed1 and Seed2 may have at least a minimum distance of the algorithm used for constructing Sd (e.g., minimum distance d). Various embodiments of constructing Sd, as described herein, facilitate at least a 4 bit difference between physically near memory elements. By having the deterministic seed satisfying the minimum distance threshold, correlation and/or data dependent disturb issues may be reduced. Accordingly, by using the computed seed described herein, uniform wearing of memory elements may be facilitated, physically near memory elements (e.g., pages) may be programmed with uncorrelated random data thereby avoiding data dependent disturb effects, linear correlation may be reduced, data robustness may be improved, bit error rates may be reduced, reliability may be improved, and/or defective parts per million (DPPM) may be reduced.

In various embodiments, the scrambler component 150 may be used to store the computed seed with the data (e.g., in a data header that is stored with the data). Moreover, in some embodiments, the scrambler component 150 may be used to scramble the data using the computed seed. In such embodiments, the computed seed may be appended to the scrambled data and stored with the scrambled data. In addition, in such embodiments, the data may be scrambled using an LFSR. In certain embodiments, the scrambler component 150 may facilitate storing the data at a physical address of a memory element. Furthermore, in one embodiment, the scrambler component 150 may be used to determine the computed seed (e.g., by extracting the seed from the stored data, by extracting the deterministic seed from the stored data) based on information (e.g., the data including the data header) stored at the physical address of the memory element. In various embodiments, the scrambler component 150 may descramble (e.g., unscramble) the data based on the extracted seed.

The scrambler component 150 may scramble the data based on the computed seed using any suitable method. In some embodiment, the scrambler component 150 may scramble the data by flipping binary values of bits of the data based on the computed seed. As used herein, the term flipping binary values of a bit means inverting the binary value of the bit. In certain embodiments, the scrambler component 150 may scramble the data by pseudo-randomizing the values of bits of the data based on the computed seed. In such embodiments, the scrambler component 150 pseudo-randomizes the values of bits of data in a reversible manner so that the bits may be converted back to their original data state. In some embodiments, the scrambler component 150 may scramble the data by XORing it with a pseudo random bit sequence that is generated as a function of the computed seed (e.g., using an LFSR that is initialized with the computed seed). In some embodiments, the scrambler component 150 may scramble the data by using encryption based on the computed seed to pseudo-randomizes the values of bits of the data. In one embodiment, the scrambler component 150 may scramble the data by rearranging bits of the data based on the computed seed.

Figure 3:
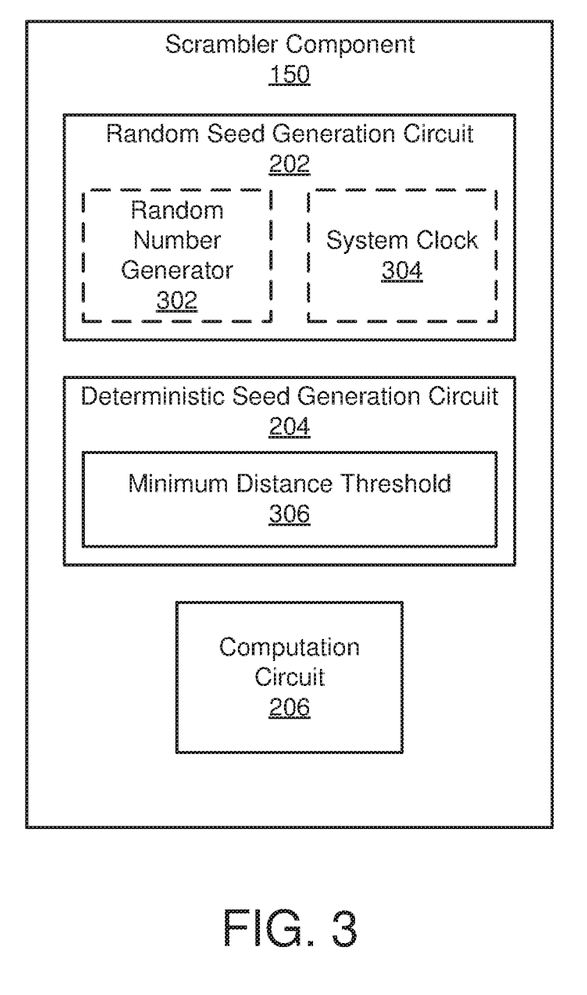
FIG. 3 is a schematic block diagram illustrating another embodiment of a scrambler component.

FIG. 3 depicts another embodiment of a scrambler component 150 (e.g., randomizer). The scrambler component 150 may be substantially similar to the scrambler component 150 described above with regard to FIGS. 1A, 1B, and/or 2. In general, as described above, the scrambler component 150 generates a random seed, generates a deterministic seed based on a physical address of the memory element for storing data, and forms a computed seed based on the random seed and the deterministic seed. Accordingly, the scrambler component 150 may facilitate generating a computed seed that is random and different from a seed used for scrambling data for a memory location adjacent to a memory location used for storing data scrambled using the computed seed. In the depicted embodiment, the scrambler component 150 includes the random seed generation circuit 202, the deterministic seed generation circuit 204, and the computation circuit 206. The random seed generation circuit 202, the deterministic seed generation circuit 204, and the computation circuit 206 may be substantially similar to the random seed generation circuit 202, the deterministic seed generation circuit 204, and the computation circuit 206 described in relation to FIG. 2. The scrambler component 150 also may include a random number generator 302, a system clock 304, and/or a minimum distance threshold 306.

In some embodiments, the random number generator 302 may be used to generate a random seed. In one embodiment, the random number generator 302 may be a dedicated circuit used specifically for generating a random seed. In various embodiments, the random seed generated by the random number generator 302 may include any suitable number of bits, such as 4 bits, 8 bits, 16 bits, 32 bits, 64 bits, 128 bits, and so forth. Moreover, in one embodiment, the random seed generator 302 may generate any suitable random seed except all zeros. In certain embodiments, the random number generator 302 may be based on an existing number generator in the system (e.g., a random number generator of another block, such as the ECC).

In various embodiments, the system clock 304 may be used to generate a random seed. In one embodiment, the system clock 304 may be part of an existing circuit having random properties. In some embodiments, the random seed generated by the system clock 304 may include any suitable number of bits, such as 4 bits, 8 bits, 16 bits, 32 bits, 64 bits, 128 bits, and so forth. Moreover, in one embodiment, the system clock 304 may generate any suitable random seed except all zeros. In certain embodiments, the random seed is generated by sampling the system clock 304. In some embodiments, the random seed may be generated by sampling certain bits of the system clock 304 (e.g., 4 LSBs, 3 LSBs, 2 LSBs, etc.).

In certain embodiments, the minimum distance threshold 306 may be any suitable minimum distance between seeds for memory elements that are physically near each other (e.g., adjacent, within a distance in which a correlation may affect each other). In some embodiments, the minimum distance threshold 306 may be measured by a number of bits in a seed that are different from bits in another seed. For bits to be different, the bits have to be a different value and be in the same position. For example, for seeds having the following format [b1 b2 b3 b4 b5 b6 b7 b8], a first seed [1 0 1 1 0 1 1 0] and a second seed [1 0 1 1 1 0 0 1] have four bits the same and four bits different. Specifically, the first and second seeds have bits b1, b2, b3, and b4 the same, and bits b5, b6, b7, and b8 different.

Figure 4:
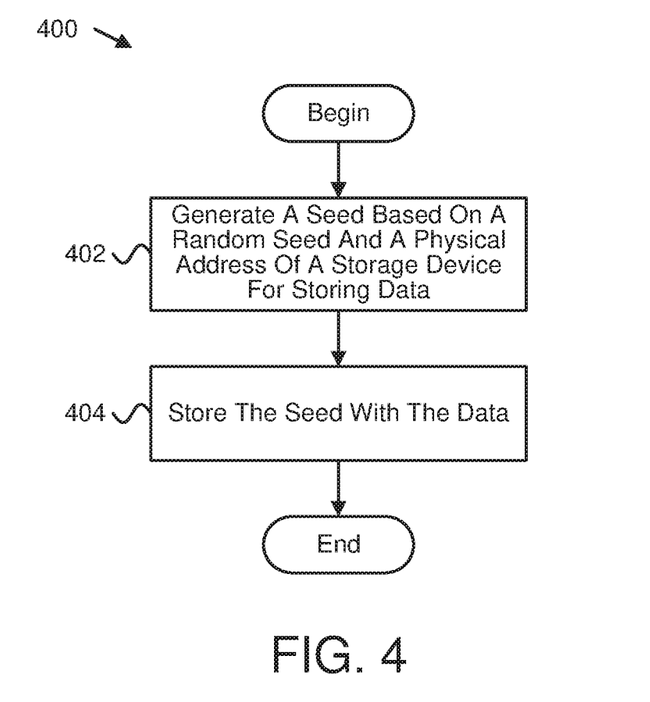
FIG. 4 is a schematic flow chart diagram illustrating one embodiment of a method for seed generation.

FIG. 4 is a schematic flow chart diagram illustrating one embodiment of a method 400 for seed generation. The method 400 begins, and the computation circuit 206 generates 402 a seed based on a random seed and a physical address of a storage device for storing data. In one embodiment, the scrambler component 150 stores 404 the seed with the data, and the method 400 ends.

A means for generating a random seed, in various embodiments, may include one or more of a scrambler component 150, a random seed generation circuit 202, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a random seed.

A means for generating a deterministic seed, in certain embodiments, may include one or more of a scrambler component 150, a deterministic seed generation circuit 204, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a deterministic seed.

A means for generating a scrambling seed using a random seed and a deterministic seed, in some embodiments, may include one or more of a scrambler component 150, a computation circuit 206, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for generating a scrambling seed using a random seed and a deterministic seed.

A means for scrambling data using a scrambling seed, in various embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for scrambling data using a scrambling seed.

A means for storing scrambled data, in certain embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for storing scrambled data.

A means for extracting a scrambling seed from scrambled data, in some embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for extracting a scrambling seed from scrambled data.

A means for unscrambling scrambled data using a scrambling seed, in various embodiments, may include one or more of a scrambler component 150, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for unscrambling scrambled data using a scrambling seed.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   generating a seed based on a random seed and an entire physical address of a storage device for storing data, wherein generating the seed comprises:
     generating the seed based on the random seed and a hamming code determined using the entire physical address for storing the data; and
     transforming the entire physical address so that seeds for physically adjacent addresses have a number of bit differences satisfying a threshold greater than one; and
   storing the seed with the data.

2. The method of claim 1, further comprising scrambling the data using the seed.

3. The method of claim 2, further comprising storing the data at the physical address.

4. The method of claim 1, further comprising determining the seed based on information stored at the physical address.

5. The method of claim 4, further comprising descrambling the data based on the seed.

6. An apparatus comprising:
   a memory element; and
   a scrambler component comprising:
     a random seed generation circuit that generates a random seed;
     a deterministic seed generation circuit that generates a deterministic seed based on an entire physical address of the memory element for storing data, wherein:
       the deterministic seed is generated by one or more of:
         performing a transformation, the result of which is based on the entire physical address; and
         by encoding the entire physical address using a non-linear code;
       the deterministic seed generation circuit generates the deterministic seed such that the deterministic seed satisfies a minimum distance threshold from another seed for an adjacent physical address; and
       the minimum distance threshold comprises the deterministic seed being different from another seed for an adjacent physical address by at least two bits; and
     a computation circuit that forms a computed seed based on the random seed and the deterministic seed, wherein the data is scrambled using the computed seed before the data is stored.

7. The apparatus of claim 6, wherein the random seed generation circuit comprises a random number generator used to generate the random seed.

8. The apparatus of claim 6, wherein the random seed is generated based on a system clock.

9. The apparatus of claim 6, wherein the minimum distance threshold comprises the deterministic seed being different from another seed for the adjacent physical address by at least four bits.

10. The apparatus of claim 6, wherein the deterministic seed generation circuit generates the deterministic seed such that the deterministic seed is not a linear combination of a set of deterministic seeds associated with adjacent physical addresses.

11. The apparatus of claim 6, wherein the computed seed comprises the random seed.

12. The apparatus of claim 6, wherein the computed seed comprises a result of a logic operation performed on the random seed and the deterministic seed.

13. The apparatus of claim 12, wherein the logic operation comprises an exclusive or operation.

14. The apparatus of claim 12, wherein the computed seed comprises a concatenation of the result of the logic operation and the random seed.

15. An apparatus comprising:
   means for generating a random seed;
   means for generating a deterministic seed based on an entire physical address for storing scrambled data, wherein:
      the deterministic seed is generated by one or more of:
         performing a transformation, the result of which is based on the entire physical address; and
         by encoding the entire physical address using a non-linear code;
      the deterministic seed generation circuit generates the deterministic seed such that the deterministic seed satisfies a minimum distance threshold from another seed for an adjacent physical address; and
      the minimum distance threshold comprises the deterministic seed being different from another seed for an adjacent physical address by at least two bits;
   means for generating a scrambling seed using the random seed and the deterministic seed;
   means for scrambling data using the scrambling seed to produce the scrambled data;
   means for storing the scrambled data;
   means for extracting the scrambling seed from the scrambled data; and
   means for unscrambling the scrambled data using the scrambling seed.

16. The apparatus of claim 15, wherein the means for extracting the scrambling seed further comprises means for extracting the deterministic seed from the scrambled data.

* * * * *